(12) United States Patent
Saito et al.

(10) Patent No.: US 8,967,308 B2
(45) Date of Patent: Mar. 3, 2015

(54) GRILLE SHUTTER APPARATUS

(71) Applicants: Aisin Seiki Kabushiki Kaisha, Kariya-shi (JP); Tatsuya Shimizu, Okazaki (JP); Masayuki Nomura, Nagakute (JP); Hironori Kanasaki, Toyota (JP)

(72) Inventors: Takashi Saito, Toyota (JP); Tatsuya Shimizu, Okazaki (JP); Masayuki Nomura, Nagakute (JP); Hironori Kanasaki, Toyota (JP)

(73) Assignees: Aisin Seiki Kabushiki Kaisha, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 135 days.

(21) Appl. No.: 13/683,210

(22) Filed: Nov. 21, 2012

(65) Prior Publication Data

US 2013/0126253 A1 May 23, 2013

(30) Foreign Application Priority Data

Nov. 22, 2011 (JP) ................................. 2011-255252

(51) Int. Cl.
*B60K 11/08* (2006.01)
(52) U.S. Cl.
CPC ........... *B60K 11/085* (2013.01); *B60Y 2306/01* (2013.01)
USPC ....................................................... 180/68.1
(58) Field of Classification Search
CPC ... B60K 11/04; B60K 11/085; B60Y 2306/01
USPC ...................................... 180/68.1, 68.6, 68.4
See application file for complete search history.

(56) References Cited

U.S. PATENT DOCUMENTS

| 7,108,092 B2 | 9/2006 | Suwa et al. |
| 2008/0308333 A1 | 12/2008 | Kapadia et al. |

(Continued)

FOREIGN PATENT DOCUMENTS

| DE | 103 37 553 A1 | 6/2005 |
| DE | 20 2007 005 860 U1 | 9/2008 |

(Continued)

OTHER PUBLICATIONS

Office Action issued Sep. 24, 2013 in Japanese Patent Application No. 2011-255252 (with English-language translation).

(Continued)

*Primary Examiner* — J. Allen Shriver, II
*Assistant Examiner* — Brian Cassidy
(74) *Attorney, Agent, or Firm* — Oblon, McClelland, Maier & Neustadt, L.L.P.

(57) ABSTRACT

A grille shutter apparatus includes a shutter mechanism arranged in an grille opening portion positioned at a front portion of a vehicle body of a vehicle to control a flow rate of air flowing from the grille opening portion to an internal portion of the vehicle body, and a frame supporting the shutter mechanism in the grille opening portion, the frame including a fixing portion at one end to be fixed in the grille opening portion, the frame including a protruding portion making contact with a front grille and generating a rotational moment at the frame in a case where the front grille arranged at an opening end of the grille opening portion moves rearward due to an occurrence of a collision of the vehicle, the rotational moment acting about the fixing portion.

6 Claims, 5 Drawing Sheets

(56) References Cited

U.S. PATENT DOCUMENTS

2010/0243352 A1 9/2010 Watanabe et al.
2011/0001325 A1* 1/2011 Bernt et al. .................. 293/155
2012/0019025 A1* 1/2012 Evans et al. ................ 296/193.1

FOREIGN PATENT DOCUMENTS

| EP | 1 849 641 A2 | 10/2007 |
|---|---|---|
| FR | 2 898 095 A1 | 9/2007 |
| JP | 55-114720 U | 8/1980 |
| JP | 57-13320 U | 1/1982 |
| JP | 58-139519 | 9/1983 |
| JP | 2001-150961 A | 6/2001 |
| JP | 2003-81034 | 3/2003 |
| JP | 2007-1503 | 1/2007 |

OTHER PUBLICATIONS

Extended European Search Report issued Feb. 27, 2013 in European Patent Application No. 12193629.8.

* cited by examiner

GRILLE SHUTTER APPARATUS

CROSS REFERENCE TO RELATED APPLICATIONS

This application is based on and claims priority under 35 U.S.C. §119 to Japanese Patent Application 2011-255252, filed on Nov. 22, 2011, the entire content of which is incorporated herein by reference.

TECHNICAL FIELD

This disclosure generally relates to a grille shutter apparatus.

BACKGROUND DISCUSSION

A known grille shutter apparatus disclosed, for example, in JP58-139519U (which will be hereinafter referred to as Reference 1) may control a flow rate of air flowing from a grille opening portion into an engine compartment, in accordance with opening and closing operations of a shutter mechanism provided at the grille opening portion arranged at a front portion of a vehicle body.

In other words, according to the grille shutter apparatus disclosed in Reference 1, the shutter mechanism is brought in a closed state, for example, while a vehicle is moving at high speed; thereby, the flow rate of the air taken into the engine compartment is restricted. Therefore, aerodynamic performance of the vehicle may be increased (for example, a "Cd value" that is a value for coefficient of drag may be decreased). Meanwhile, according to the grille shutter apparatus of Reference 1, a flow rate of air taken into a radiator is restricted when an engine is started; thereby, a period of time to warm up the engine may be reduced. In addition, according to the grille shutter apparatus of Reference 1, for example, in a case where a temperature of the engine tends to rise, the shutter mechanism is brought in an opened state to thereby increase the flow rate of the air flowing into the engine compartment. Therefore, the temperature of the engine may be appropriately controlled.

In addition, an impact absorbing configuration is recently disclosed, for example, in JP2003-81034A (which will be hereinafter referred to as Reference 2). According to Reference 2, for example, when a collision of a vehicle occurs, the impact absorbing configuration is configured so that a front grille arranged at a front portion of a vehicle body moves into a grille opening portion in a rearward direction of the vehicle by an external force caused by the collision. The impact absorbing configuration is applied to the vehicle; thereby, an impact applied to an object, for example, a pedestrian and a bicycle, against which the vehicle collides, is absorbed and thus the object may be protected from the impact.

However, for example, in a vehicle provided with a grille shutter apparatus, a front grille is moved in a rearward direction of the vehicle by a collision of the vehicle and may therefore interfere with a shutter mechanism arranged in a grille opening portion or with a support member (frame) supporting the shutter mechanism. Consequently, the front grille is restricted from smoothly moving in the rearward direction; therefore, an impact applied to an object against which the vehicle collides may not be sufficiently absorbed by the movement of the front grille in the rearward direction.

A need thus exists for a grille shutter apparatus which is not susceptible to the drawback mentioned above.

SUMMARY

According to an aspect of this disclosure, a grille shutter apparatus includes a shutter mechanism arranged in an grille opening portion positioned at a front portion of a vehicle body of a vehicle to control a flow rate of air flowing from the grille opening portion to an internal portion of the vehicle body, and a frame supporting the shutter mechanism in the grille opening portion, the frame including a fixing portion at one end to be fixed in the grille opening portion, the frame including a protruding portion making contact with a front grille and generating a rotational moment at the frame in a case where the front grille arranged at an opening end of the grille opening portion moves rearward due to an occurrence of a collision of the vehicle, the rotational moment acting about the fixing portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
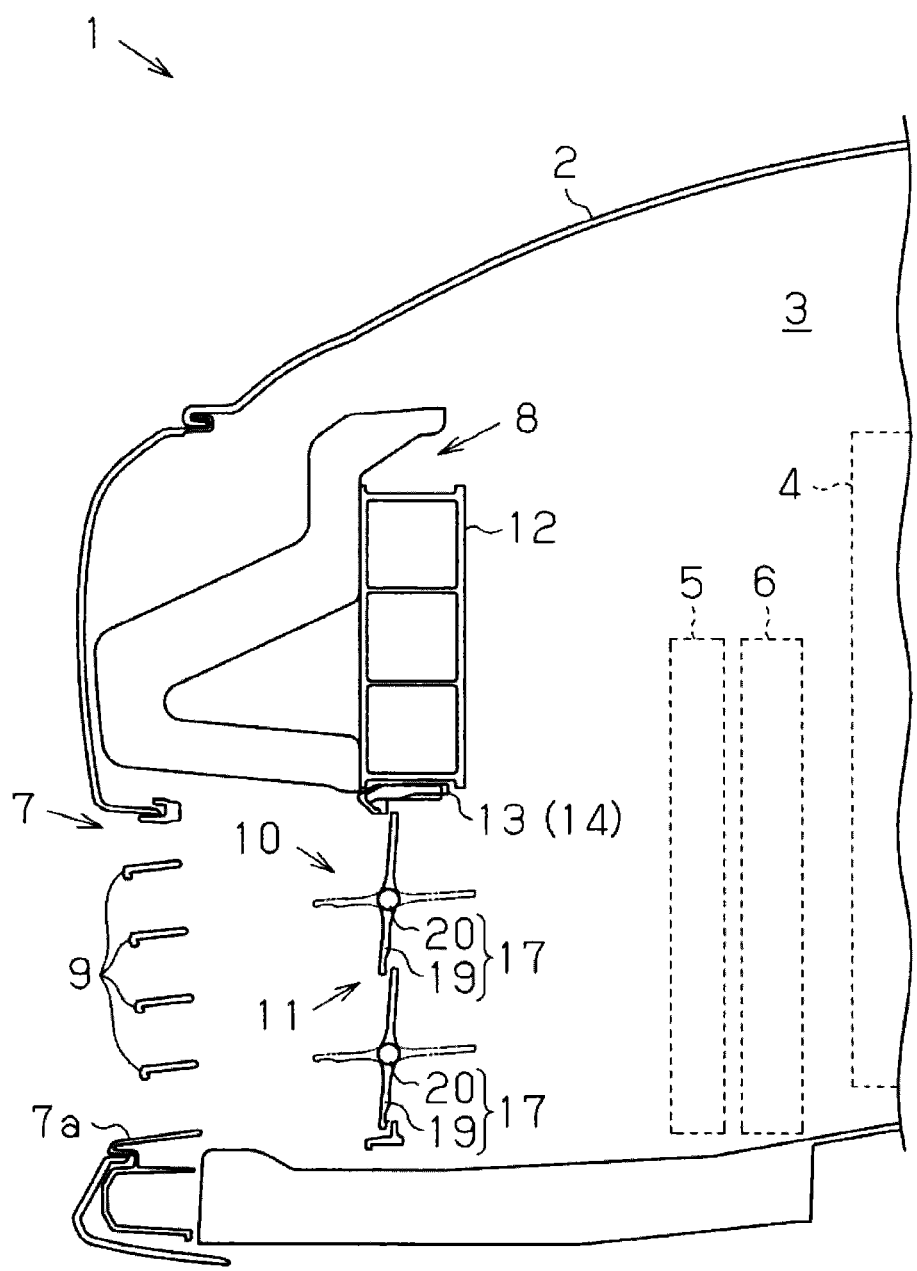
FIG. 1 is a side view schematically illustrating a configuration of a vehicle in which a grille shutter apparatus according to an embodiment disclosed here is mounted.

An embodiment of this disclosure will be explained as follows with reference to the illustrations of the attached drawings. As illustrated in FIG. 1, a radiator 5 for cooling an engine 4 is accommodated in an engine compartment 3 formed within a vehicle body 2 of a vehicle 1. A grille opening portion 7 is formed at a front portion of the vehicle body 2 (at an end portion at the left side in FIG. 1). An external space at a front side of the vehicle 1 and an internal space (internal portion) of the vehicle body 2 are connected to each other by the grille opening portion 7. The radiator 5 is arranged at a front side of the engine 4 so that air flowing from the grille opening portion 7 to the engine compartment 3 comes into contact with the radiator 5.

In addition, a fan 6 is arranged at a rear side of the radiator 5 (at the right side in FIG. 1). The fun 6 rotates and thus the air flowing from the grille opening portion 7 effectively flows to the radiator 5.

In the embodiment, the grille opening portion 7 is formed at a lower side of a bumper 8. A front grille 9 configuring a design surface (a lower grille) of the grille opening portion 7 is attached to an opening end 7a of the grille opening portion 7. In addition, the vehicle 1 according to the embodiment is provided with a grille shutter apparatus 10 that may control or adjust a flow rate of the air flowing from the grille opening portion 7 to the engine compartment 3 (to the internal portion of the vehicle body 2).

In particular, the grille shutter apparatus 10 includes a shutter mechanism 11 and a frame 13 supporting the shutter mechanism 11 within the grille opening portion 7. The shutter mechanism 11 is configured to open and close, thereby controlling the flow rate of the air.

Figure 2:
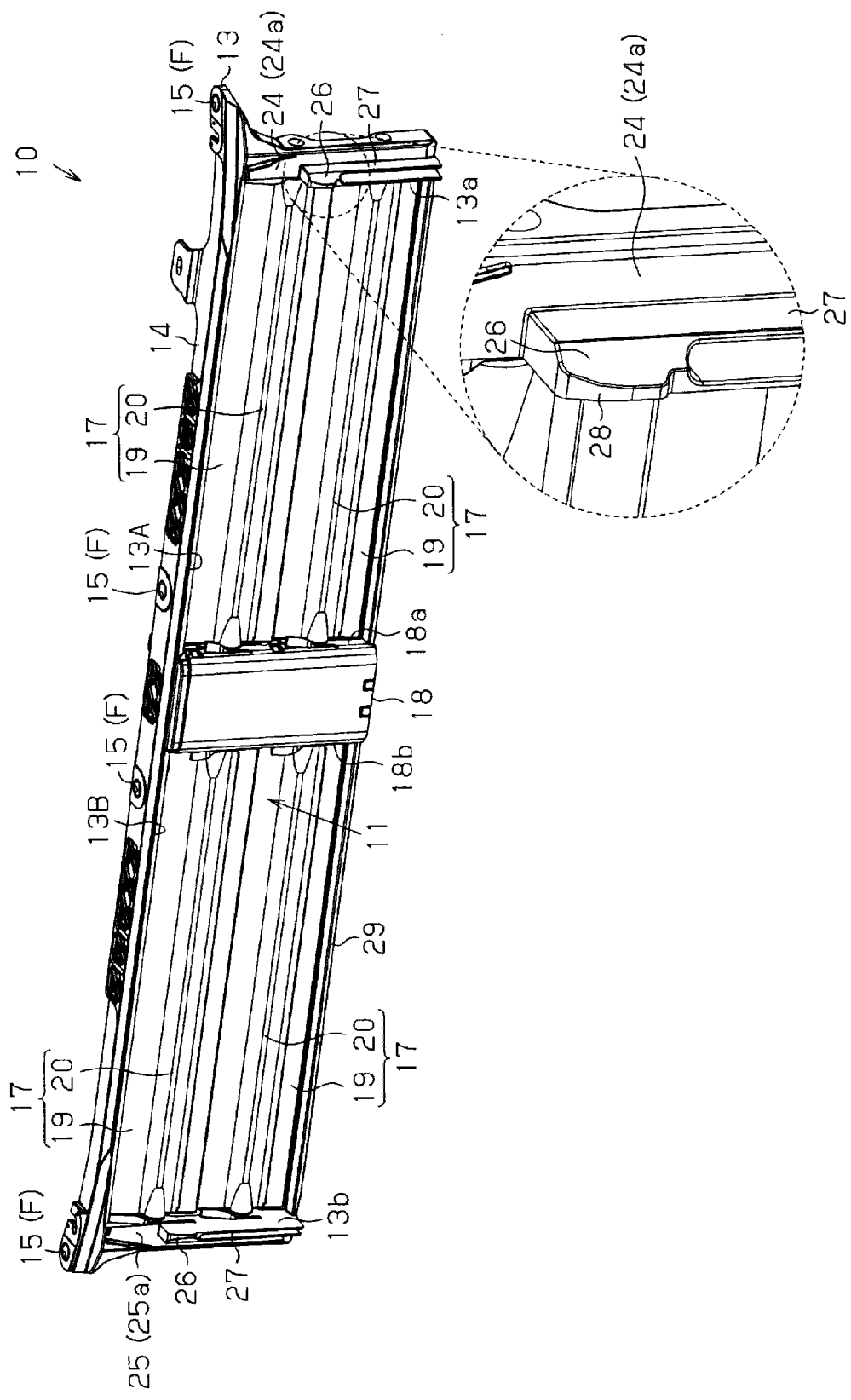
FIG. 2 is a perspective view of the grille shutter apparatus according to the embodiment disclosed here.
Figure 6:
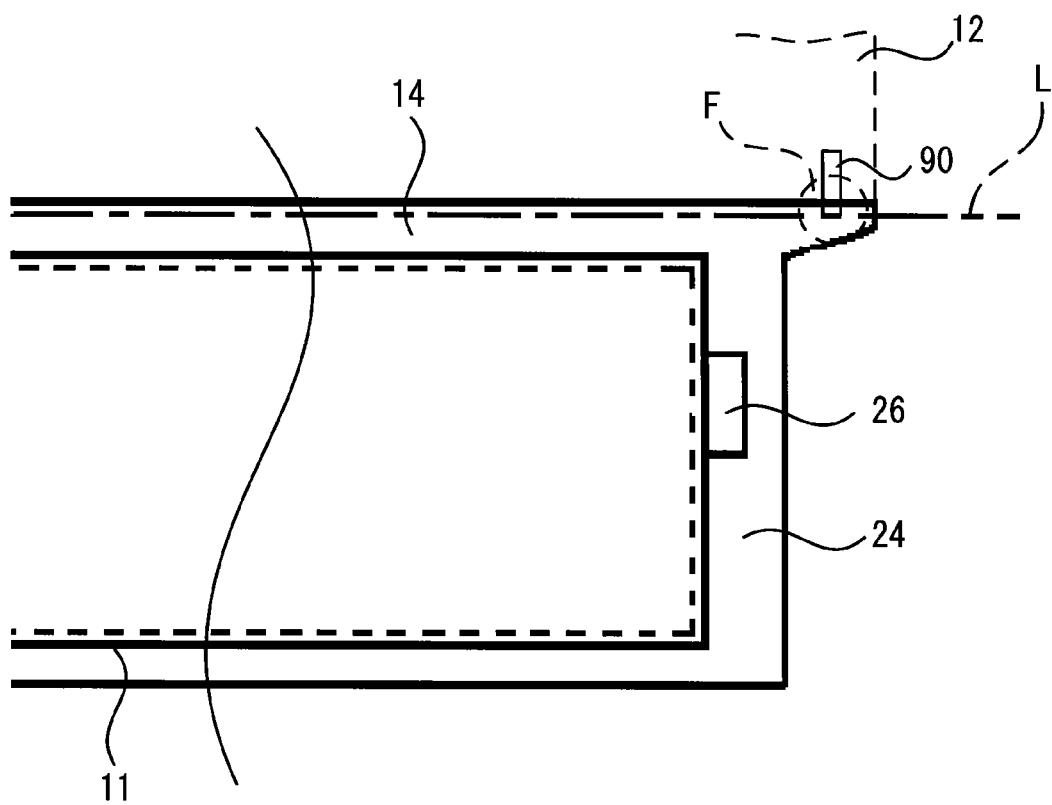
FIG. 6 is a schematic view illustrating a connecting configuration between the frame and a bumper reinforcement.

As illustrated in FIG. 2, the frame 13 is formed in a substantially rectangular shape extending in a width direction of the vehicle body 2. Bolt insertion holes (four bolt insertion holes) 15 are formed in an upper frame portion 14 of the frame 13. The bolt insertion holes 15 penetrate through the upper frame portion 14 in a vertical direction in FIG. 2. In particular, the bolt insertion holes 15 are arranged at the upper frame portion 14 extending substantially linearly, so as to be separated from one another in the width direction. In addition, as illustrated in FIG. 6, the frame 13 is fixed to a bumper reinforcement 12 by a fastening force of each of bolts 90 inserted in the bolt insertion holes 15, thereby being arranged within the grille opening portion 7 (see FIG. 1).

The shutter mechanism 11 includes multiple movable fins 17 arranged within the frame 13 in an aligned manner and an actuator portion 18 driving the movable fins 17 so that the movable fins 17 open and close left and right opening portions 13A, 13B of the frame 13.

As illustrated in FIG. 2, the actuator portion 18 having an outer shape formed in a substantially columnar shape is arranged approximately at an intermediate portion of the frame 13 in a width direction thereof. The frame 13 is divided into the left and right opening portions 13A, 13B by the actuator portion 18 (the left and right opening portions 13A, 13B will be hereinafter simply referred to as opening portions 13A, 13B). The movable fins 17 are arranged in two rows at each of the opening portions 13A, 13B.

In particular, the movable fins 17 include fin portions 19 each having a substantially elongated flat shape extending in the width direction of the frame 13, and rotary shafts 20. Here, the actuator portion 18 includes side surfaces 18a, 18b opposite to each other in the width direction of the frame 13 and the frame 13 includes inner surfaces 13a, 13b at side ends in the width direction. The inner surfaces 13a, 13b of the frame 13 face the side surfaces 18a, 18b, respectively, of the actuator portion 18. The aforementioned rotary shafts 20 are provided so as to extend between the side surface 18a and the inner surface 13a and between the side surface 18b and the inner surface 13b in the width direction of the frame 13. In addition, the actuator portion 18 drives the rotary shafts 20 to thereby rotate or move the movable fins 17.

According to the grille shutter apparatus 10 of the embodiment, the movable fins 17 rotate in a direction to bring the fin portions 19 in parallel to a flow direction of the air flowing from the grille opening portion 7 (i.e., the movable fins 17 rotate in a clockwise direction seen in FIG. 1); thereby, the shutter mechanism 11 is brought into an opened state. On the other hand, the movable fins 17 rotate in a direction to bring the fin portions 19 in perpendicular to the flow direction of the air flowing from the grille opening portion 7 (i.e., the movable fins 17 rotate in a counterclockwise direction seen in FIG. 1); thereby, the shutter mechanism 11 is brought into a closed state. In addition, in a case where the movable fins 17 are in a position corresponding to a fully closed state thereof, respective ends (respective fin ends of the fin portions 19) of the movable fins 17 positioned side by side are overlapped with one another; thereby, the opening portions 13A, 13B may be closed.

According to the grille shutter apparatus 10 of the embodiment, the rotation of the movable fins 17 is controlled by the actuator portion 18. Thus, the flow rate of the air flowing from the grille opening portion 7 to the engine compartment 3 may be controlled by opening and closing operations of the shutter mechanism 11 in accordance with the rotation of the movable fins 17.

[Impact Absorbing Configuration]Next, an impact absorbing configuration of the grille shutter apparatus 10 of the embodiment will be explained as follows. When a front portion of the vehicle 1 collides with an object or the like, the vehicle 1 is configured so that the front grille 9 arranged at the opening end 7a of the grille opening portion 7 is moved in the grille opening portion 7 in a rearward direction of the vehicle 1 by an external force acting on the front portion of the vehicle 1 because of the collision. In addition, the grille shutter apparatus 10 according to the embodiment is configured so that the movement of the front grille 9 in the rearward direction may not be interfered by the shutter mechanism 11 and the frame 13 that are arranged in the grille opening portion 7.

Figure 3:
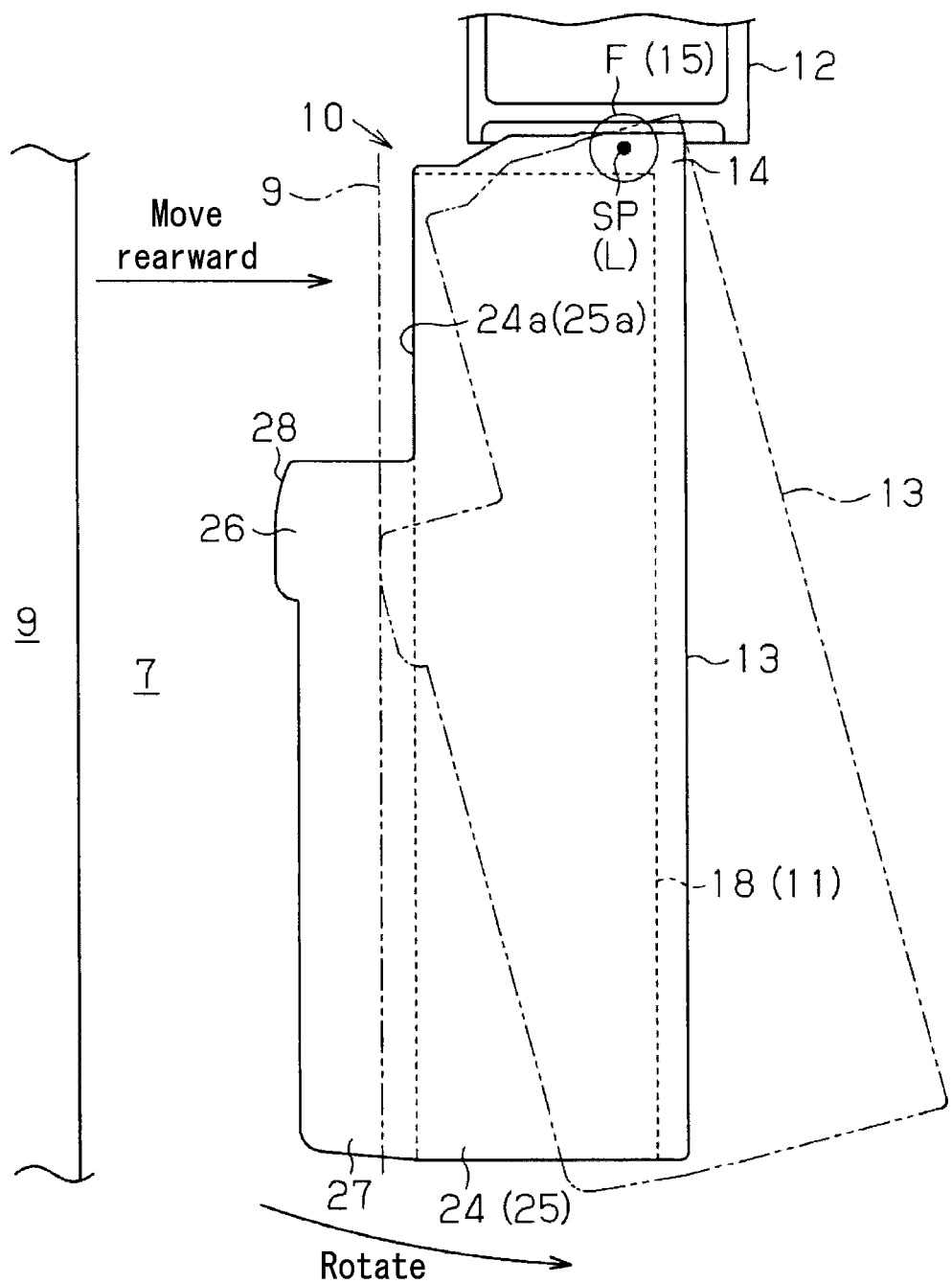
FIG. 3 is an explanation drawing showing a function of the grille shutter apparatus according to the embodiment disclosed here.

In particular, as illustrated in FIG. 3, protruding portions 26 are arranged at side frame portions 24, 25 of the frame 13 so as to protrude from the side frame portions 24, 25 in a forward direction of the vehicle body 2 (toward the left side in FIG. 3) in a state where the frame 13 is arranged within the grille opening portion 7. Plated-shape protruding portions 27 extending vertically are arranged at front surfaces 24a, 25a of the side frame portions 24, 25, respectively so as to protrude in the forward direction. The protruding portions 26 are arranged at upper ends of the plated-shape protruding portions 27 so as to be substantially vertical thereto, thereby being configured to protrude further in the forward direction than the actuator portion 18.

For example, when a collision of the vehicle 1 occurs, the front grille 9 is moved in the grille opening portion 7 in the rearward direction, therefore making contact with the protruding portions 26. Accordingly, the protruding portions 26 are pressed by the front grille 9; therefore, a rotational moment about a supporting point SP provided between the bumper reinforcement 12 and a fixing portion F of the frame 13 is generated at the frame 13. The supporting point SP corresponds to the fixing portion F (each of the bolt insertion holes 15, see FIG. 2). As described above, according to the grille shutter apparatus 10 of the embodiment, the frame 13 and the shutter mechanism 11 rotate by the rotational moment, thereby smoothly moving the front grille 9 in the rearward direction.

Figure 4:
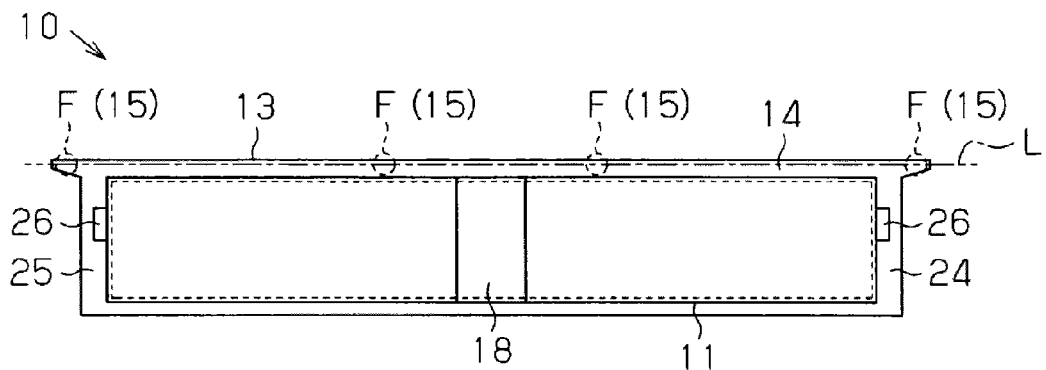
FIG. 4 is a schematic view illustrating a positional relation between protruding portions arranged at a frame.

Further, in particular, the frame 13 is made of resin. In addition, as illustrated in FIG. 4, the frame 13 includes the multiple fixing portions F (the bolt insertion holes 15 in FIG. 2) that are arranged at the upper frame portion 14 positioned at an upper end (an end) of the frame 13. The fixing portions F are linearly arranged at intervals in the width direction of the frame 13.

In other words, the fixing portions F are elastically deformed by the pressing force of the front grille 9 that is brought into contact with the protruding portions 26. Accordingly, a central axis L of the rotational moment is generated along the upper frame portion 14 at which the fixing portions F are arranged. In addition, the frame 13 is configured to rotate in the rearward direction about the upper frame portion 14 along which the central axis L is generated (the frame 13 is configured to rotate in a counter clockwise direction seen in FIG. 3).

The pressing force acting on the frame 13 from the forward direction is converted to a shearing force acting on the fixing portions F and to the rotational moment about the supporting points SP corresponding to the fixing portions F, respectively. In addition, the further a point of application of the pressing force is away from the upper frame portion 14 along which the central axis L of the rotational moment is generated, the higher a rate of the pressing force converted to the rotational moment is. That is, the rate of the pressing force converted to the rotational moment increases as the point of application of the pressing force is located at a further lower portion of each of the side frame portions 24, 25.

However, an amount of rotation of the frame 13 (a rotational stroke thereof) relative to a distance in which the front grille 9 moves in the rearward direction increases as the point of application of the pressing force is closer to the upper frame portion 14 about which the frame 13 rotates. That is, the rotational stroke of the frame 13 increases as the point of application of the pressing force is located at a further upper portion of each of the side frame portions 24, 25.

In consideration of the aforementioned rate of the pressing force converted to the rotational moment and the aforementioned rotational stroke of the frame 13, in the embodiment, a position at which each of the protruding portions 26 is formed is established so that the rotational moment generated at the frame 13 and the rotational stroke thereof may be optimized. As a result, a deformation mode (for example, buckling or compression) of the frame 13, which may restrict the front grille 9 from smoothly moving in the rearward direction, may be restricted from occurring in the embodiment.

Figure 5:
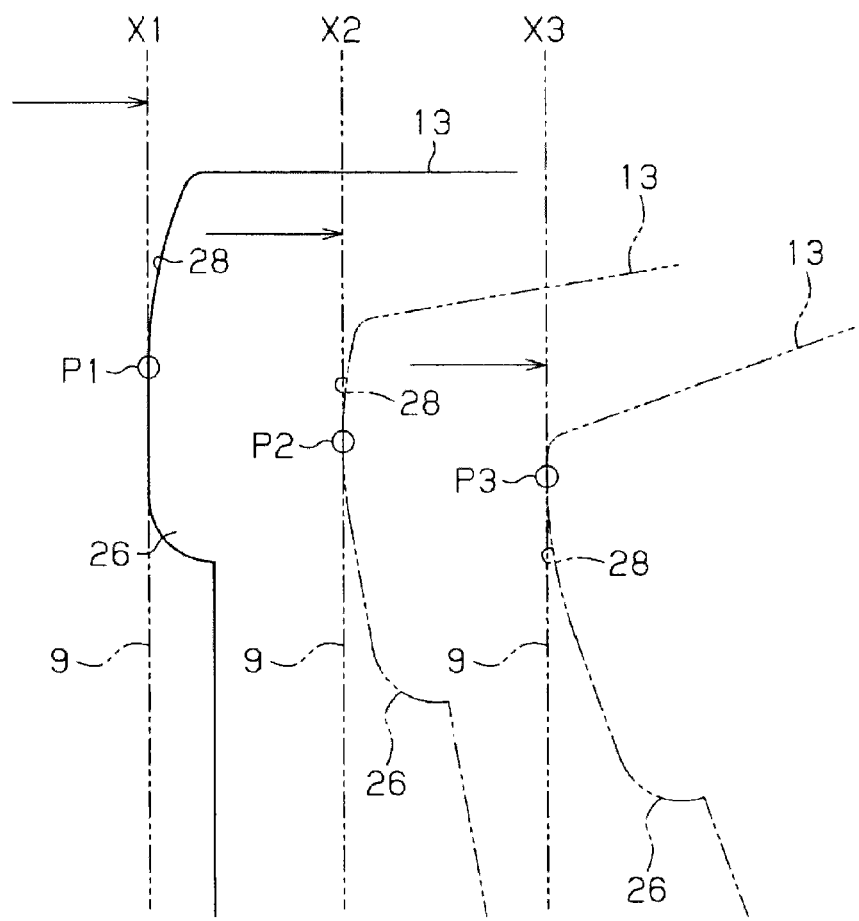
FIG. 5 is an explanation drawing showing a relation between a rearward movement position of a front grille and a contact portion on a curved surface in contact with the front grille.

In addition, as illustrated in FIG. 2, each of the protruding portions 26 includes a curved surface 28 including a contact portion with the front grille 9 moved in the rearward direction. In particular, as illustrated in FIG. 5, the curved surface 28 is designed so as to have a convex protruding in the forward direction (toward the left side in FIG. 5). Therefore, according to the embodiment, the contact portion of the protruding portion 26 with the front grille 9 is configured to shift on the curved surface 28 depending on a position to which the front grille 9 is moved in the rearward direction. Hereinafter, the position to which the front grille 9 is moved in the rearward direction will be referred to as a rearward movement position of the front grille 9.

In particular, the contact portion of the protruding portion 26 with the front grille 9 is defined as a contact portion P1 in a case where the rearward movement position of the front grille 9 brought in contact with the protruding portion 26 is a rearward movement position X1. For example, when the front grille 9 shifts from the rearward movement position X1 to a rearward movement position X2, the contact portion P1 shifts to a contact portion P2 that is located at an upper side of the contact portion P1. Further, when the front grille 9 shifts from the rearward movement position X2 to a rearward movement position X3, the contact portion P2 shifts to a contact portion P3 that is located at an upper side of the contact portion P2. As a result, according to the embodiment, the pressing force applied from the front grille 9 to the frame 13 may be converted to the rotational moment thereof regardless of the rearward movement position of the front grille 9. In addition, the rotational moment is restricted from suddenly changing and thus the frame 13 may be smoothly deformed.

According to the aforementioned embodiment, the following effects may be obtained. (1) According to the embodiment, the grille shutter apparatus 10 includes the shutter mechanism 11 arranged at the grille opening portion 7 to thereby control the flow rate of the air flowing from the grille opening portion 7, and the frame 13 supporting the shutter mechanism 11 within the grille opening portion 7. The frame 13 includes the fixing portions F arranged at the upper frame portion 14 that is positioned at the upper end of the frame 13. The frame 13 is fixed and held by the fixing portions F to the bumper reinforcement 12. In addition, the protruding portions 26 are arranged at the side frame portions 24, 25 of the frame 13 so as to protrude from the side frame portions 24, 25 in the forward direction of the vehicle body 2.

According to the aforementioned configuration, for example, when a collision of the vehicle 1 occurs, the front grille 9 is moved in the grille opening portion 7 in the rearward direction, therefore being brought in contact with the protruding portions 26 of the frame 13. Accordingly, the protruding portions 26 are pressed by the front grille 9; therefore, the rotational moment about the supporting points SP corresponding to the fixing portions F is generated at the frame 13. Thus, the frame 13 (and the shutter mechanism 11) rotates about the upper frame portion 14 along which the central axis L of the rotational moment is generated. As a result, the front grille 9 may smoothly move in the rearward direction.

In particular, according to the embodiment, each of the protruding portions 26 protruding from the front surfaces 24a, 25a of the side frame portions 24, 25 serves as the point of application of the pressing force of the front grille 9. Therefore, the rotational moment generated at the frame 13 and the rotational stroke thereof may be controlled or adjusted on the basis of a position at which the point of application of the pressing force is provided. Moreover, the rotational stroke of the frame 13 may be controlled or adjusted by a protruding length of the protruding portion 26; thereby, the rotational moment and the rotational stroke of the frame 13 may be optimized. As a result, the deformation mode (for example, buckling or compression) of the frame 13, which may occur due to a different reason from the rotation, may be restricted; therefore, the front grille 9 may further smoothly move in the rearward direction.

(2) According to the embodiment, the protruding portions 26 are arranged at the upper frame portion 14 about which the frame 13 rotates, and are positioned at intervals in a direction along the upper frame portion 14. In particular, the protruding portions 26 are arranged at the side frame portions 24, 25 positioned at both ends (the side ends) of the frame 13 in a direction along the central axis L of the rotational moment generated at the frame 13. Accordingly, the frame 13 may stably rotate. In addition, the shutter mechanism 11 arranged between the protruding portions 26 (within the frame 13) may be effectively protected.

(3) According to the embodiment, the protruding portions 26 are configured to protrude further in the forward direction than the actuator portion 18 driving the movable fins 17 so that the movable fins 17 open and close. As a result, the actuator portion 18 is restricted from being damaged by the front grille 9 moved in the rearward direction, therefore being inhibited from being frequently repaired.

(4) According to the embodiment, each of the protruding portions 26 includes the curved surface 28 formed so that the contact portion with the front grille 9 shifts on the curved surface 28 from P1 through P2 to P3 when the front grille 9 moves from the rearward movement position X1 through the rearward movement position X2 to the rearward movement position X3 (see FIG. 5).

According to the aforementioned configuration, the pressing force acting from the front grille 9 to the frame 13 may be effectively converted to the rotational moment regardless of the rearward movement position of the front grille 9. Consequently, the frame 13 (and the shutter mechanism 11) is further smoothly rotated, therefore not inhibiting the front grille 9 from moving in the rearward direction.

In addition, the aforementioned embodiment may be modified as follows. According to the embodiment, the air flowing from the grille opening portion 7 is taken into the engine compartment 3 formed within the vehicle body 2. Alternatively, the air flowing from the grille opening portion 7 may be taken into an internal space different from the engine compartment 3 as long as the internal space is the internal space of the vehicle body 2 where the flow rate of the air from the grille opening portion 7 may be controlled in accordance with the opening and closing operations of the shutter mechanism 11. That is, it is appropriate for the vehicle body 2 to include an internal space in which the air flowing from the grille opening portion 7 is taken. The internal space of the vehicle body 2 may be, for example, an accommodating portion in which a heat exchanger corresponding to the radiator 5 is accommodated. The internal space may be applied to a vehicle including a vehicle body that has a rear portion or a central portion in which an engine is arranged, or to a vehicle, for example, an electric vehicle where an engine is not arranged at an internal space of a vehicle body, which is located at a front side of a passenger cabin of the vehicle.

According to the embodiment, the grille opening portion 7 is arranged at the lower side of the bumper 8. Alternatively, the grille opening portion 7 may be arranged at an upper side of the bumper 8. That is, the front grille 9 may be an upper grille.

According to the embodiment, the opening and closing operations of the shutter mechanism 11 are performed by the rotation of the movable fins 17. Alternatively, the shutter mechanism 11 may be configured to be provided, for example, with a slidable member or a movable member that swings or oscillates.

According to the embodiment, the frame 13 is in the substantially rectangular shape extending in the width direction of the vehicle body 2. Alternatively, the frame 13 may be formed in any shape as long as the frame 13 includes the fixing portion F arranged at one end of the frame 13. According to the embodiment, the fixing portion F (the bolt insertion hole 15) is formed in the upper frame portion 14 corresponding to the upper end of the frame 13. Alternatively, the fixing portion F may be formed in a lower frame portion 29 (see FIG. 1) corresponding to a lower end of the frame 13, or may be formed in any of the side frame portions 24, 25 corresponding to the side ends of the frame 13 in the width direction thereof.

Further, according to the embodiment, the multiple (four) fixing portions F are formed in the upper frame portion 14 and are linearly arranged at intervals in the width direction of the frame 13. Alternatively, the number of fixing portions F may be one. In addition, in a case where the multiple fixing portions F are arranged at the upper frame portion 14, the arrangement of the fixing portions F may be arbitrarily designed.

According to the embodiment, the protruding portions 26 are arranged at the side frame portions 24, 25, respectively, of the frame 13. Alternatively, the number of protruding portions 26 and the position of each of the protruding portions 26 may be arbitrarily changed. That is, the protruding portion 26 may be arranged at one of the side frame portions 24, 25. Moreover, for example, in a case where the frame 13 includes a cylindrical portion at an intermediate portion in the width direction, a protruding portion may be formed at the intermediate portion. In addition, for example, in a case where the fixing portion F is arranged at a position different from the upper frame portion 14 of the frame 13, it is appropriate that a protruding portion is formed so as to conform to the central axis L of a desired rotational moment.

According to the embodiment, each of the protruding portions 26 includes the curved surface 28 configured so that the contact portion with the front grille 9 shifts depending on the rearward movement position of the front grille 9. Alternatively, the protruding portion 26 may be configured not to include the curved surface 28 as long as the pressing force of the front grille 9 may be effectively converted to the rotational moment regardless of the rearward movement position of the front grille 9.

As described above, according to the aforementioned embodiment, the grille shutter apparatus 10 includes the shutter mechanism 11 arranged in the grille opening portion 7 positioned at the front portion of the vehicle body 2 of the vehicle 1 to control the flow rate of the air flowing from the grille opening portion 7 to the internal portion of the vehicle body 2, and the frame 13 supporting the shutter mechanism 11 in the grille opening portion 7, the frame 13 including the fixing portion F at the upper end to be fixed in the grille opening portion 7, the frame 13 including the protruding portion 26 making contact with the front grille 9 and generating the rotational moment at the frame 13 in a case where the front grille 9 arranged at the opening end 7a of the grille opening portion 7 moves in the rearward direction due to an occurrence of a collision of the vehicle 1, the rotational moment acting about the fixing portion F.

According to the aforementioned configuration, the rotational moment is generated by a pressing force acting from the front grille 9 because of the collision, thereby pressing the protruding portion 26 to rotate the frame 13. For example, in a case where the frame 13 includes the fixing portions F arranged at intervals, the central axis L of the rotational moment is an axis along the arrangement of the fixing portions F. In addition, the frame 13 rotates about the central axis L of the rotational moment, thereby smoothly moving the front grille 9 in the rearward direction.

In particular, the protruding portion 26 serves as a point of application of the pressing force of the front grille 9. Therefore, the rotational moment generated at the frame 13 and the rotational stroke thereof may be controlled or adjusted on the basis of a position at which the point of application of the pressing force is provided. Moreover, the rotational stroke of the frame 13 may be controlled or adjusted by the protruding length of the protruding portion 26; thereby, the rotational moment and the rotational stroke of the frame 13 may be optimized. As a result, the deformation mode (for example, buckling or compression) of the frame 13, which may occur due to a different reason from the rotation, may be restricted; therefore, the front grille 9 may further smoothly move in the rearward direction.

According to the aforementioned embodiment, the frame 13 includes the protruding portion 26 including the multiple protruding portions 26 arranged at intervals in the direction along the central axis L of the rotational moment.

According to the aforementioned configuration, for example, even in a case where an impact is obliquely inputted to the vehicle 1 from the front side thereof, at least one of the protruding portions 26 is pressed by the pressing force of the front grille 9; therefore, the frame 13 may rotate. In addition, portions of the shutter mechanism 11 arranged between the protruding portions 26 may be effectively protected.

According to the aforementioned embodiment, the frame 13 includes the multiple protruding portions 26 arranged at the side ends in the direction along the central axis L of the rotational moment.

According to the aforementioned embodiment, the shutter mechanism 11 includes the movable fins 17 arranged within the frame 13 and the actuator portion 18 driving the movable fins 17 so that the movable fins 17 open and close, and the protruding portions 26 are provided at the frame 13 so as to protrude further forward than the actuator portion 18.

According to the aforementioned configuration, the actuator portion 18 may be restricted from being damaged by the front grille 9 moved in the rearward direction, therefore being inhibited from being frequently repaired.

According to the aforementioned embodiment, the protruding portion 26 includes the curved surface 28 configured so that the contact portion of the protruding portion 26 with the front grille 9 shifts on the curved surface 28 depending on the position to which the front grille 9 is moved in the rearward direction.

According to the aforementioned configuration, the pressing force of the front grille 9 may be effectively converted to the rotational moment regardless of the position to which the front grille 9 is moved in the rearward direction. In addition, the contact portion gradually shifts on the curved surface 28. As a result, the frame 13 (and the shutter mechanism 11) is further smoothly rotated without a sudden change of the rotational moment, thereby not inhibiting the front grille 9 from moving in the rearward direction.

According to the aforementioned embodiment, the frame 13 is fixed to the bumper reinforcement 12.

According to the aforementioned embodiment, the internal portion is the engine compartment 3.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A grille shutter apparatus, comprising:
    a shutter mechanism arranged in an grille opening portion positioned at a front portion of a vehicle body of a vehicle to control a flow rate of air flowing from the grille opening portion to an internal portion of the vehicle body; and
    a frame supporting the shutter mechanism in the grille opening portion, the frame including a fixing portion at only one end to be fixed in the grille opening portion, the frame including a protruding portion making contact with a front grille and generating a rotational moment at the frame in a case where the front grille arranged at an opening end of the grille opening portion moves rearward due to an occurrence of a collision of the vehicle, the rotational moment acting about the fixing portion,
    wherein the protruding portion includes a curved surface configured so that a contact portion of the protruding portion with the front grille shifts on the curved surface depending on a position to which the front grille is moved rearward.

2. The grille shutter apparatus according to claim 1, wherein the frame includes the protruding portion including a plurality of protruding portions arranged at intervals in a direction along a central axis of the rotational moment, the central axis extending along a length of the frame.

3. The grille shutter apparatus according to claim 2, wherein the frame includes the plurality of protruding portions arranged at both ends in the direction along the central axis of the rotational moment, the central axis extending along the length of the frame.

4. The grille shutter apparatus according to claim 1, wherein the shutter mechanism includes a movable fin arranged within the frame and an actuator portion driving the movable fin so that the movable fin opens and closes, and
    wherein the protruding portion is provided at the frame so as to protrude further forward than the actuator portion.

5. The grille shutter apparatus according to claim 1, wherein the frame is fixed to a bumper reinforcement.

6. The grille shutter apparatus according to claim 1, wherein the internal portion is an engine compartment.

* * * * *